(12) United States Patent
Pines et al.

(10) Patent No.: US 8,979,277 B2
(45) Date of Patent: Mar. 17, 2015

(54) METHOD, APPARATUS AND SYSTEM FOR AUTOMATED COLOR MANAGEMENT IN DIGITAL CINEMA

(75) Inventors: Joshua Pines, San Francisco, CA (US); Michael Allan Sterling, Westlake Village, CA (US)

(73) Assignee: Thomson Licensing, Issy les Moulineaux (FR)

( * ) Notice: Subject to any disclaimer, the term of this patent is extended or adjusted under 35 U.S.C. 154(b) by 357 days.

(21) Appl. No.: 12/736,567

(22) PCT Filed: May 2, 2008

(86) PCT No.: PCT/US2008/005700
§ 371 (c)(1),
(2), (4) Date: Oct. 20, 2010

(87) PCT Pub. No.: WO2009/134229
PCT Pub. Date: Nov. 5, 2009

(65) Prior Publication Data
US 2011/0032363 A1    Feb. 10, 2011

(51) Int. Cl.
*G03B 21/00* (2006.01)
*H04N 9/31* (2006.01)

(52) U.S. Cl.
CPC .............. *G03B 21/00* (2013.01); *H04N 9/3182* (2013.01); *H04N 9/3194* (2013.01); *H04N 9/3197* (2013.01)
USPC .................. 353/85; 353/69; 353/70; 353/122

(58) Field of Classification Search
CPC .. H04N 9/3182; H04N 9/3194; H04N 9/3197
USPC ......................................... 353/69, 70, 85, 122
See application file for complete search history.

(56) References Cited

U.S. PATENT DOCUMENTS

| | | | |
|---|---|---|---|
| 6,340,976 B1 | 1/2002 | Oguchi et al. |
| 6,768,510 B2 | 7/2004 | IaGrone et al. |
| 6,771,323 B1 | 8/2004 | Dean et al. |
| 6,862,554 B2 | 3/2005 | Ng |

(Continued)

FOREIGN PATENT DOCUMENTS

| | | |
|---|---|---|
| EP | 0989757 A1 | 3/2000 |
| EP | 172107 | 11/2006 |

(Continued)

OTHER PUBLICATIONS

International Search Report Dated Jan. 27, 2009.

*Primary Examiner* — Sultan Chowdhury
*Assistant Examiner* — Bao-Luan Le
(74) *Attorney, Agent, or Firm* — Robert D. Shedd; Jorge Tony Villabon

(57) ABSTRACT

Embodiments of the present invention provide a method, apparatus and system for digital cinema color management. In one embodiment, a digital cinema color management system includes a projection device configured to project image content and a color meter configured to measure color levels of the projected image content. A control device is also provided including a validation module configured for validating the measured color levels of the color meter for preventing the creation of erroneous correction data. A calibration module determines if calibration of the color levels is required and provides real-time corrective color information to a projector.

16 Claims, 2 Drawing Sheets

(56) References Cited

U.S. PATENT DOCUMENTS

| | | |
|---|---|---|
| 6,963,668 B2 | 11/2005 | Engeldrum et al. |
| 6,987,586 B2 | 1/2006 | Bogdanowicz et al. |
| 7,050,121 B2 | 5/2006 | Kim |
| 7,053,927 B2 | 5/2006 | Jones et al. |
| 7,164,428 B2 | 1/2007 | Wada et al. |
| 7,184,054 B2 * | 2/2007 | Clark ............................ 345/589 |
| 7,274,428 B2 | 9/2007 | Long et al. |
| 7,314,283 B2 * | 1/2008 | Tsukada ........................ 353/121 |
| 7,333,154 B2 | 2/2008 | Dean et al. |
| 7,417,643 B2 | 8/2008 | Matsuda |
| 2002/0089611 A1 * | 7/2002 | Kim ............................... 348/745 |
| 2003/0164927 A1 * | 9/2003 | Tsukada ........................ 353/31 |
| 2003/0179211 A1 | 9/2003 | Wada et al. |
| 2004/0140981 A1 * | 7/2004 | Clark ............................ 345/600 |
| 2004/0140982 A1 * | 7/2004 | Pate ............................... 345/600 |
| 2005/0206856 A1 * | 9/2005 | Ishii ............................... 353/94 |
| 2007/0132893 A1 * | 6/2007 | Miyazawa et al. ............ 348/745 |
| 2008/0036785 A1 * | 2/2008 | Jeong et al. ................... 345/589 |

FOREIGN PATENT DOCUMENTS

| | | |
|---|---|---|
| EP | 1726927 A1 | 11/2006 |
| JP | 2001134252 | 5/2001 |
| JP | 2002281250 | 9/2002 |
| JP | 2003280629 | 10/2003 |
| JP | 3514776 | 3/2004 |
| JP | 2004341269 | 12/2004 |
| JP | 2006108988 A | 4/2006 |

* cited by examiner

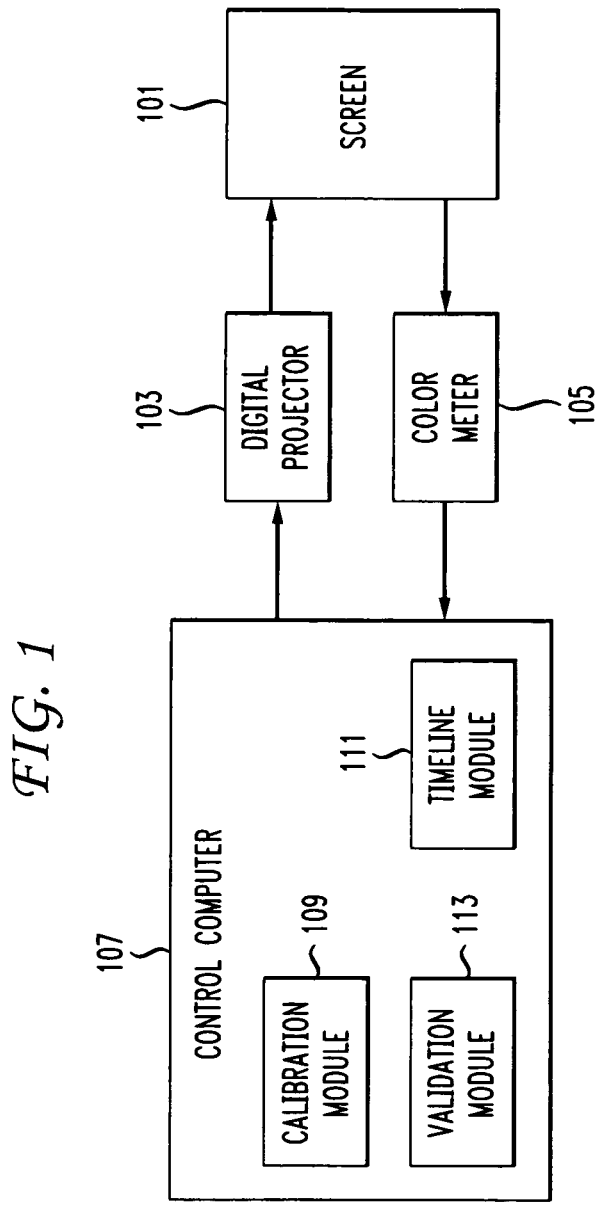

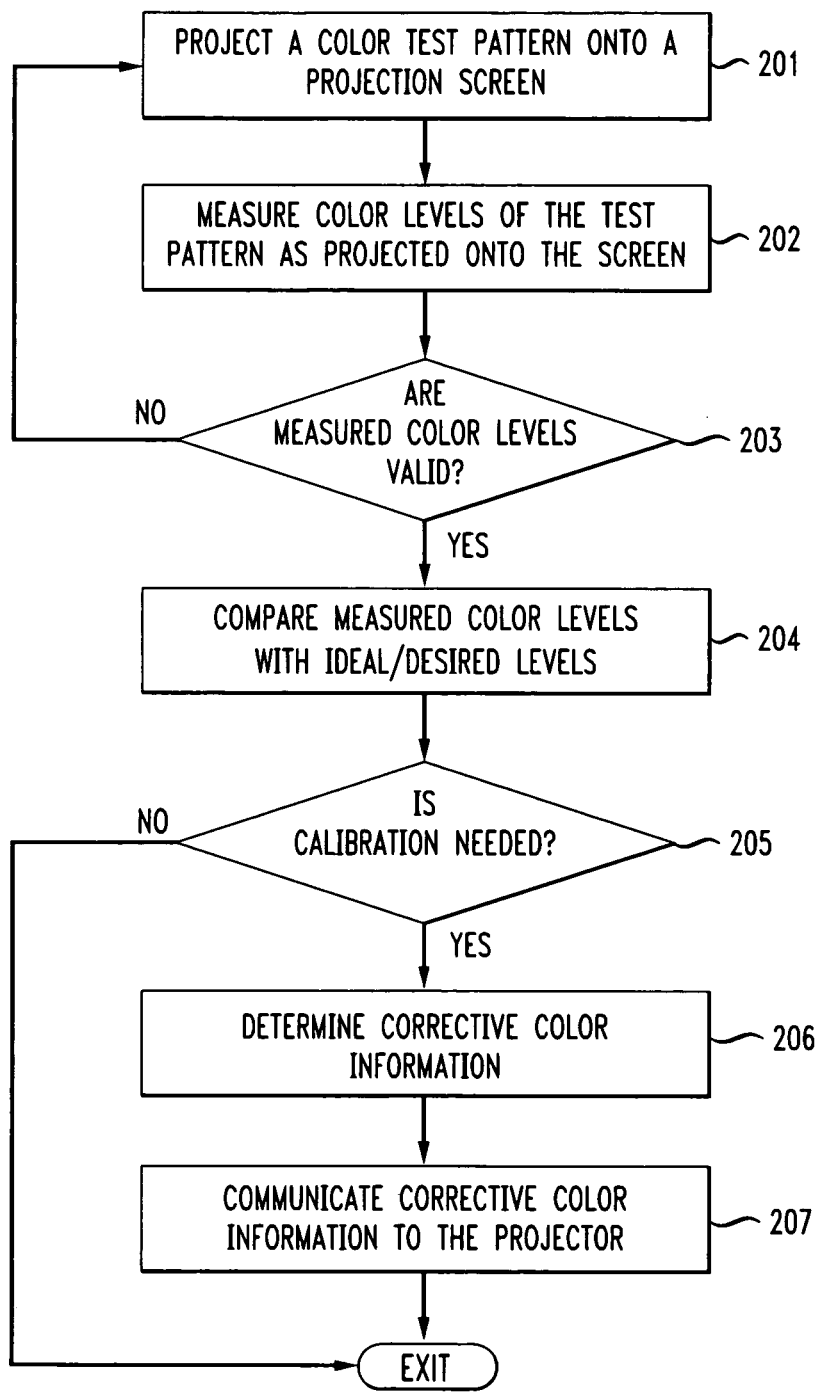

METHOD, APPARATUS AND SYSTEM FOR AUTOMATED COLOR MANAGEMENT IN DIGITAL CINEMA

This application claims the benefit, under 35 U.S.C. §365 of International Application PCT/US2008/005700, filed May 2, 2008, which was published in accordance with PCT Article 21(2) on Nov. 5, 2009 in English.

FIELD OF THE INVENTION

The present invention generally relates to motion picture quality control, and more particularly, to a system and method for providing automated, real-time color management and control for maintaining color fidelity in digital theater projection systems.

BACKGROUND OF THE INVENTION

Color management or color calibration generally refers to the adjustment of the colors of one output device to match those of another. The device that is to be calibrated is typically referred to as a calibration source and the device that serves as a comparison standard is often referred to as a calibration target. Both target and source may comprise a color space such as Adobe™ RGB or CMYK color space, a test print, color chart or material sample.

In Digital Light Processing (DLP) projectors, the image is created by microscopically small mirrors laid out in a matrix on a semiconductor chip, known as a Digital Micromirror Device (DMD). Each mirror represents one or more pixels in the projected image. The number of mirrors corresponds to the resolution of the projected image, for example, 800×600, 1024×768, 1280×720, and 1920×1080 (HDTV) matrices are some common DMD sizes. These mirrors can be repositioned rapidly to reflect light either through the lens or on to a heatsink. Rapidly toggling the mirror between these two orientations (essentially on and off) produces grayscales, controlled by the ratio of on time to off time. Two primary methods by which DLP projection systems create a color image include those utilized by single-chip DLP projectors, and those used by three-chip projectors.

Digital Cinema projectors in commercial cinemas are still in the early stages of deployment today but are likely to become commonplace over the next several years. Digital Cinema projectors are used on a regular basis in the color grading process associated with digital intermediate post production. In such an application a manual test is made with a color meter and adjustments are made to the projector if required to maintain proper color accuracy. However, this type of daily attention is not practical nor is it envisioned to be employed in a commercial environment. Indeed, the presentation qualities in commercial cinemas regularly suffer from inconstant picture quality often due to inconsistent color fidelity.

Accordingly, a system and method for maintaining color fidelity in Digital Cinema projection systems to improve presentation quality and consistency is highly desirable.

SUMMARY OF THE INVENTION

The method, apparatus and system of the present invention are directed to Digital Cinema projection systems and work either in conjunction with or separately from other techniques relating to image quality, such as, light level monitoring and control, to comprehensively improve presentation quality and consistency of image content.

A system and method is provided including a color meter device configured to measure various colors, preferably native color primaries (e.g., red, green and blue) levels as projected onto a screen (e.g., via a Digital Cinema projector), a control system that interfaces with theatre automation to perform a sequence of events (e.g., compare color levels and provide color correction information) based on a pre-set time or event, and a calibration system configured to calibrate the Digital Cinema projector based on the results of the measurements made.

Most commercial projectors today use some method to control various inputs, settings and common operations such as lamp strike, dowser open and internal test pattern display. A system and method according to the present principles creates a macro sequence to instruct the projector to project test images such as all red, green or blue patterns upon the projection screen. The color meter, sensitive to the red, green and blue test patterns, is mounted, e.g., inside or outside of the projection booth. This meter is calibrated to read the color test patterns projected and outputs the measured data to a control device for analysis.

In one aspect of the present principles, a color management system is provided comprising a projection device configured to project image content onto a screen, a color meter configured to measure color level readings of the image content projected on the screen and a control device including a calibration module configured for determining if calibration of the color levels is needed and providing real-time corrective color information to the projection device.

According to another aspect, a digital cinema color management system is provided comprising a projection device configured to project image content, a color meter configured to measure color levels of projected image content, and a control device including a validation module configured for validating the measured color levels of the color meter and a calibration module configured for determining if calibration of the color levels is needed and providing real-time corrective color information to the projector.

According to yet another aspect, a method for providing digital cinema color management is provided comprising the steps of projecting image content, measuring color levels of the projected image content, validating the measured color levels, and determining if calibration of the color levels is needed.

These, and other aspects, features and advantages of the present invention will be described or become apparent from the following detailed description of the preferred embodiments, which is to be read in connection with the accompanying drawings.

BRIEF DESCRIPTION OF THE DRAWINGS

The teachings of the present invention can be readily understood by considering the following detailed description in conjunction with the accompanying drawings, in which:

FIG. 1 depicts a high level block diagram of an exemplary system for providing color management in a Digital Cinema projection system in accordance with an embodiment of the present invention; and FIG. 2 depicts a flow diagram of an exemplary method for providing color management in a Digital Cinema projection system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

Embodiments of the present invention provide a method, apparatus and system for providing color control, calibration and management in a Digital Cinema projection system. Although the present principles will be described primarily within the context of a Digital Cinema projection system, the specific embodiments of the present principles should not be treated as limiting the scope of the invention. It will be appreciated by those skilled in the art and informed by the teachings of the present principles that the concepts of the present principles can be advantageously applied in other environments in which digital color management functions are desired.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with the various embodiments of the present invention, a method, apparatus and system are disclosed which advantageously provide a means for characterizing and self-correcting the colorimetry of a digital projector to maintain color fidelity. A method, apparatus and system according to an aspect of the present principles can be designed to work in conjunction with or independently of other picture quality monitoring techniques, such as light level monitoring and control, to improve overall picture quality and consistency.

FIG. 1 depicts a high level block diagram of an exemplary system for providing color management in a Digital Cinema projection system in accordance with an embodiment of the present invention. The system of FIG. 1 illustratively comprises a digital projector 103 for projecting image content (e.g., color test patterns, movie images, etc.) onto a screen 101. A control device 107 is provided, operably connected to the projector 103, which includes at least a calibration module 109, a timeline module 111, and a validation module 113.

A color meter 105 is provided, configured to be sensitive to detect certain preset colors, for example, preferably native primary colors such as red, green and blue (RGB), and positioned at a location in view of the screen 101 to be able to detect image content projected thereon. The color meter 105 is configured to detect and measure color level readings of the projected image content. While the measurement of colors was described above with reference to primary colors, RGB, the measurement of other colors/color combinations can be contemplated in accordance with the aspects of the present invention.

The control device 107 can comprise a processor and includes the calibration module 109 configured for determining if calibration of the color levels is needed and providing real-time corrective color information to the projection device 103.

FIG. 2 depicts a flow diagram of an exemplary method for providing color management in a Digital Cinema projection system in accordance with an embodiment of the present invention. While the flow diagram of FIG. 2 will be herein described with reference to the elements of FIG. 1, it is not necessarily limited to those elements. It is noted that the method described herein is particularly useful and applicable to substantially any Digital Cinema projection techniques.

The method of FIG. 2 begins at step 201 in which at least one color test pattern, such as an all red, green or blue test pattern, is projected onto a projection screen by, for example, the digital cinema projector 103. The method then proceeds to step 202.

At step 202, the color levels of the test pattern as projected onto the screen are measured by, for example, the color meter 105. In one embodiment of the present invention, the color meter 105 is calibrated to measure the color test pattern(s) projected. The method then proceeds to step 203.

At step 203, data related to the measurement of the color test patterns is validated. For example, in one embodiment of the present invention, data related to the measurement of the color test pattern(s) measured by the color meter is communicated to the control device 107. The control device 107 includes a validation module 113 configured to validate the data readings from the color meter 105 by comparing the data to a predetermined range of probable results. The range of probable or likely results can include a range of color levels which can be reasonably contemplated to be measured from the projected test colors. If the measured data is within the predetermined color range, the data is considered 'valid' or validated and the method proceeds to step 204. If the measured data exceeds the range of likely results, the method returns to step 201 to restart the color level assessment process of the method of the present invention so as not to attempt to create correction data for erroneous conditions.

That is, in accordance with embodiments of the present invention, if measured data exceeds a range of expected results, an error condition is assumed and the color correction control of the present invention is not performed. Advantageously, the validation process of the present invention protects against unexpected and undesirable external environment conditions (i.e., such as the lights in an empty auditorium being left on and causing light to flood the screen during testing) from creating incorrect correction data.

At step 204, the validated data is compared with ideal/desired/target color levels using, for example, the calibration module 109. The method then proceeds to step 205.

At step 205, it is determined whether calibration is needed. For example, in one embodiment of the present invention, the calibration module 109 assesses whether color calibration is needed. That is, calibration can be needed if the validated color level readings are outside of a predetermined tolerance range for acceptable color levels. If the validated data is within the predetermined tolerance range for acceptable color levels, the method is exited. However, if the validated data is outside the predetermined tolerance range for acceptable color levels and calibration is needed, the method proceeds to step 206.

At step 206, corrective color information is determined. For example, in one embodiment of the present invention, the calibration module 109 can determine real-time color corrective control information. That is, the calibration module 109 determines color information to be communicated to the projector for enabling the projector to cause the measured color levels to change, such that the color levels of, for example, the color test pattern(s) projected onto the screen are within the predetermined tolerance range for acceptable color levels. The method then proceeds to step 207.

At step 207, the corrective color information is communicated to the projector to effect a change in the color levels for the selected or measured colors/color primaries to substantially match a desired color level or range and therefore bring the projected image in line with a desired level/calibration. The method is then exited.

Referring back to FIG. 1, in various embodiment of the present invention, the control device 107 can further include a timeline module 111 configured to record, store and allow for retrieval of stored data such as data from the color meter 105. For example, step 202 can include an additional optional step wherein the timeline module 111 can create, store and present the measured color meter readings in chronological order or a 'timeline' format, which can be used to provide useful information about the operation and status of the digital projector as well as subsystems such as the bulb, reflector, etc. That is, the timeline module 111 is configured for storing measurements over time to determine, for example, long term drift, and can be configured to store data for any of the other projector components. Advantageously, the measured color meter readings in timeline format can be used to predict future performance and/or mean time before failure.

Having described various embodiments for a method, apparatus and system for digital cinema color management (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A color management system comprising:
a projection device configured to project image content;
a color meter configured to directly measure color levels of the projected image content and externally output the measured color levels independent of the projected image content;
a validation module configured to validate the measured color levels by comparing the measured color levels with a predetermined range of probable color level results, the measured color levels being valid if they are within the predetermined range of probable color level results; and
a control device including a calibration module configured to compare the validated measured color levels to desired color levels, to determine if calibration of the color levels is needed and to provide real-time corrective color information to the projection device when it is determined calibration is needed.

2. The system of claim 1, wherein the projection device comprises a digital cinema projector.

3. The system of claim 1, wherein the image content comprises at least one color test pattern.

4. The system of claim 1, wherein the control device includes a timeline module configured for storing and presenting the measured color levels in chronological order.

5. The system of claim 3, wherein the color meter is calibrated to read projected color test patterns.

6. A digital cinema color management system comprising:
a projection device configured to project image content;
a color meter configured to directly measure color levels of the projected image content and externally output the measured color levels independent of the projected image content; and
a control device including a validation module configured to validate the measured color levels of the color meter by comparing the measured color levels with a predetermined range of probable results, the measured color levels being validated if they are within the predetermined range of probable results, and a calibration module configured to compare the validated color levels to desired color levels to determine if calibration is needed and to provide real-time corrective color information to the projection device when it is determined calibration is needed.

7. The system of claim 6, wherein the projection device comprises a digital cinema projector.

8. The system of claim 6, wherein the image content comprises at least one color test pattern.

9. The system of claim 6, wherein the calibration module is configured to compare validated color levels to desired color levels, wherein if calibration of the validated color levels is needed further comprising changing the validated color levels to substantially match the desired color levels.

10. The system of claim 6, wherein the control device further comprises a timeline module configured for storing and presenting the measured color levels in chronological order.

11. The system of claim 8, wherein the color meter is calibrated to read the at least one color test pattern.

12. A method for providing digital cinema color management comprising the steps of:
projecting image content;
directly measuring color levels of the projected image content using a color meter and externally outputting the measured color levels independent of the projected image content;
validating the measured color levels by comparing the measured color levels with a predetermined range of probable results, the measured color levels being validated if they are within the predetermined range of probable results;
determining if calibration of the color levels is needed by comparing validated color levels to desired color levels; and
performing calibration of a projection device projecting the image content when the compared validated color levels fall within a predetermined tolerance range for acceptable color levels.

13. The method of claim 12, wherein the step of projecting comprises projecting at least one color test pattern onto the screen.

14. The method of claim 12, wherein if calibration of the color levels is needed further comprising the step of changing the color levels to substantially match the desired color levels.

15. The method of claim 12, wherein if the measured color levels are not validated, further comprising the step of assuming an error condition.

16. The method of claim 12, wherein the step of measuring further comprises the steps of storing and presenting the measured color levels in chronological order.

\* \* \* \* \*